United States Patent
Thomas et al.

(10) Patent No.: US 7,543,479 B2
(45) Date of Patent: Jun. 9, 2009

(54) MACHINE FOR PRESSURE TESTING CONTAINER

(75) Inventors: Alan E. Thomas, Clearwater, FL (US); Michael C. Bagley, Palm Harbor, FL (US); Philippe Spiteri, St. Petersburg, FL (US); Richard B. Otto, Crystal Beach, FL (US)

(73) Assignee: Emhart Glass S.A. (CH)

( * ) Notice: Subject to any disclaimer, the term of this patent is extended or adjusted under 35 U.S.C. 154(b) by 0 days.

(21) Appl. No.: 11/903,784

(22) Filed: Sep. 24, 2007

(65) Prior Publication Data

US 2008/0072660 A1    Mar. 27, 2008

Related U.S. Application Data

(60) Provisional application No. 60/827,009, filed on Sep. 26, 2006.

(51) Int. Cl.
*G01M 3/02* (2006.01)
(52) U.S. Cl. ........................................................ 73/37
(58) Field of Classification Search .................. 73/40, 73/41, 45, 49.2; 209/522, 523
See application file for complete search history.

(56) References Cited

U.S. PATENT DOCUMENTS

| | | | | |
|---|---|---|---|---|
| 3,555,881 A * | 1/1971 | Ayers | ............................. | 73/37 |
| 3,894,424 A * | 7/1975 | Taylor et al. | ................. | 73/49.2 |
| 4,285,230 A * | 8/1981 | Hartness | ..................... | 73/49.4 |
| 4,691,830 A * | 9/1987 | Ahl et al. | .................... | 209/523 |
| 4,837,707 A * | 6/1989 | Giometti et al. | .............. | 702/51 |
| 4,852,415 A * | 8/1989 | Bogatzki et al. | ........... | 73/865.8 |
| 5,392,928 A * | 2/1995 | Nickey et al. | .............. | 209/643 |
| 6,164,122 A * | 12/2000 | Sisbarro et al. | ................ | 73/45 |
| 6,857,307 B2 * | 2/2005 | Gebele et al. | ................. | 73/38 |
| 2005/0109082 A1 * | 5/2005 | Stewart et al. | ................. | 73/40 |

\* cited by examiner

*Primary Examiner*—Hezron Williams
*Assistant Examiner*—Gunnar J Gissel
(74) *Attorney, Agent, or Firm*—Reinhart Boerner Van Deuren s.c.

(57) ABSTRACT

An inspection machine for pressure testing a glass bottle filled with water. A normal test pressurizes the bottle until the pressure reaches an acceptable level. If the bottle bursts or leaks the pressure will not reach the acceptable level. A control monitors the pressure curve and can determine when a bottle bursts. The control can also determine that a leak is present and when the leak happens with "N" successive bottles, the control indicates that there is a maintenance problem.

12 Claims, 4 Drawing Sheets

MACHINE FOR PRESSURE TESTING CONTAINER

The present invention is a continuation-in-part of U.S. Patent Application Ser. No. 60/827,009, filed Sep. 26, 2006, now abandoned.

The present invention relates to machines for inspecting glass containers to provide feedback information to be used by an operator to modify the performance of the machine that produced the container.

BACKGROUND OF THE INVENTION

It is important that a glass bottle, to be filled with a liquid under pressure, be sufficiently strong that it will not fail in use.

Prior art systems that pressure test a glass bottle or container, fill the bottle with water and apply pressure at a selected rate until a defined pressure exists within the bottle. If the bottle is unable to be pressurized to this pressure the operator knows that there is a problem.

OBJECT OF THE INVENTION

It is an object of the present invention to provide an inspection machine that can pressure test a glass bottle and provide the operator with key information in addition to the fact that the bottle has failed the pressure test.

Other objects and advantages of the present invention will become apparent from the following portion of this specification and from the accompanying drawings which illustrate, in accordance with the mandate of the patent statutes, a presently preferred embodiment incorporating the principles of the invention.

BRIEF DESCRIPTION OF THE PREFERRED EMBODIMENT

Figure 2:
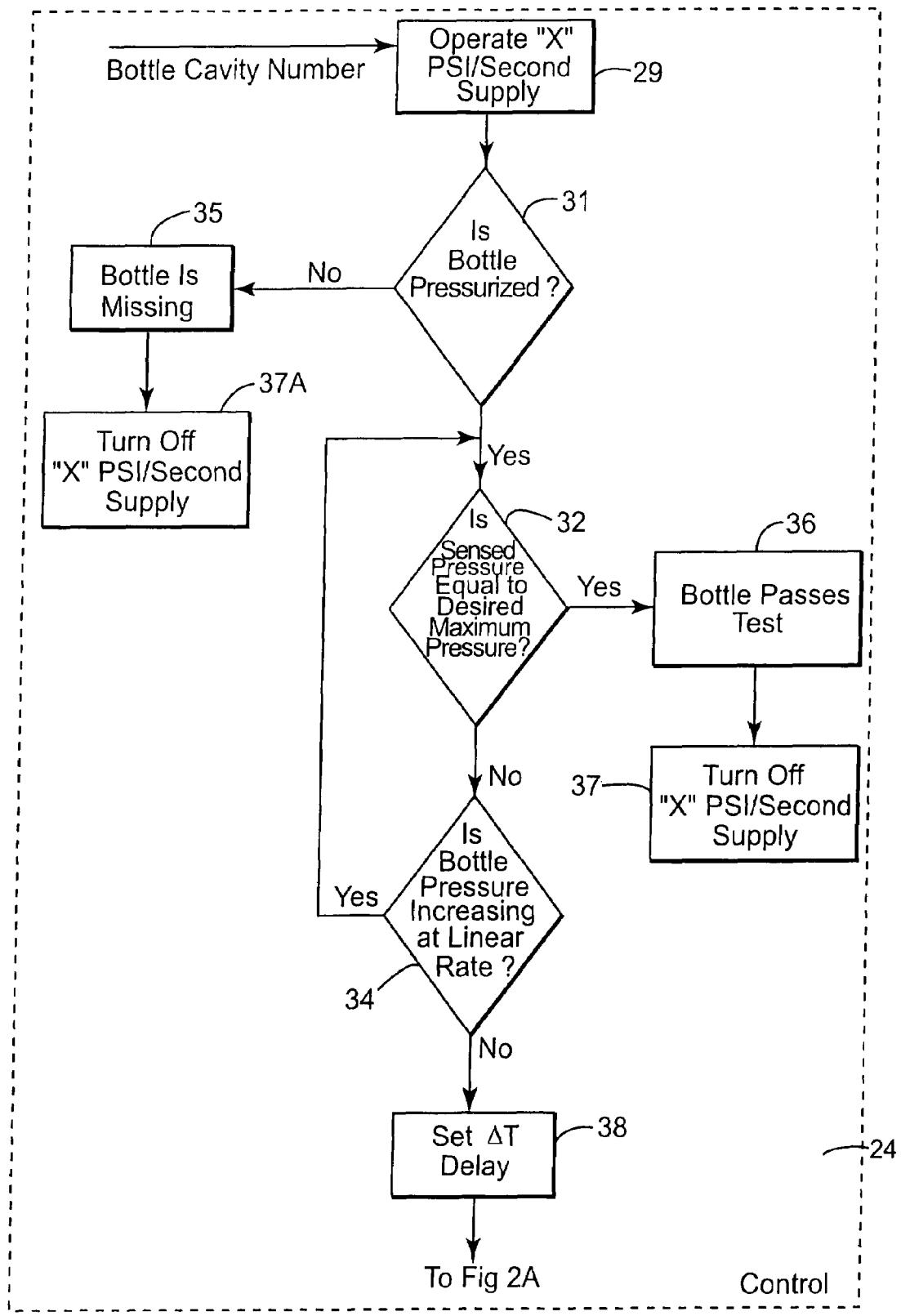
FIGS. 2 and 2A are a flow chart illustrating the structure of the control of the machine shown in FIG. 1.
Figure 2A:
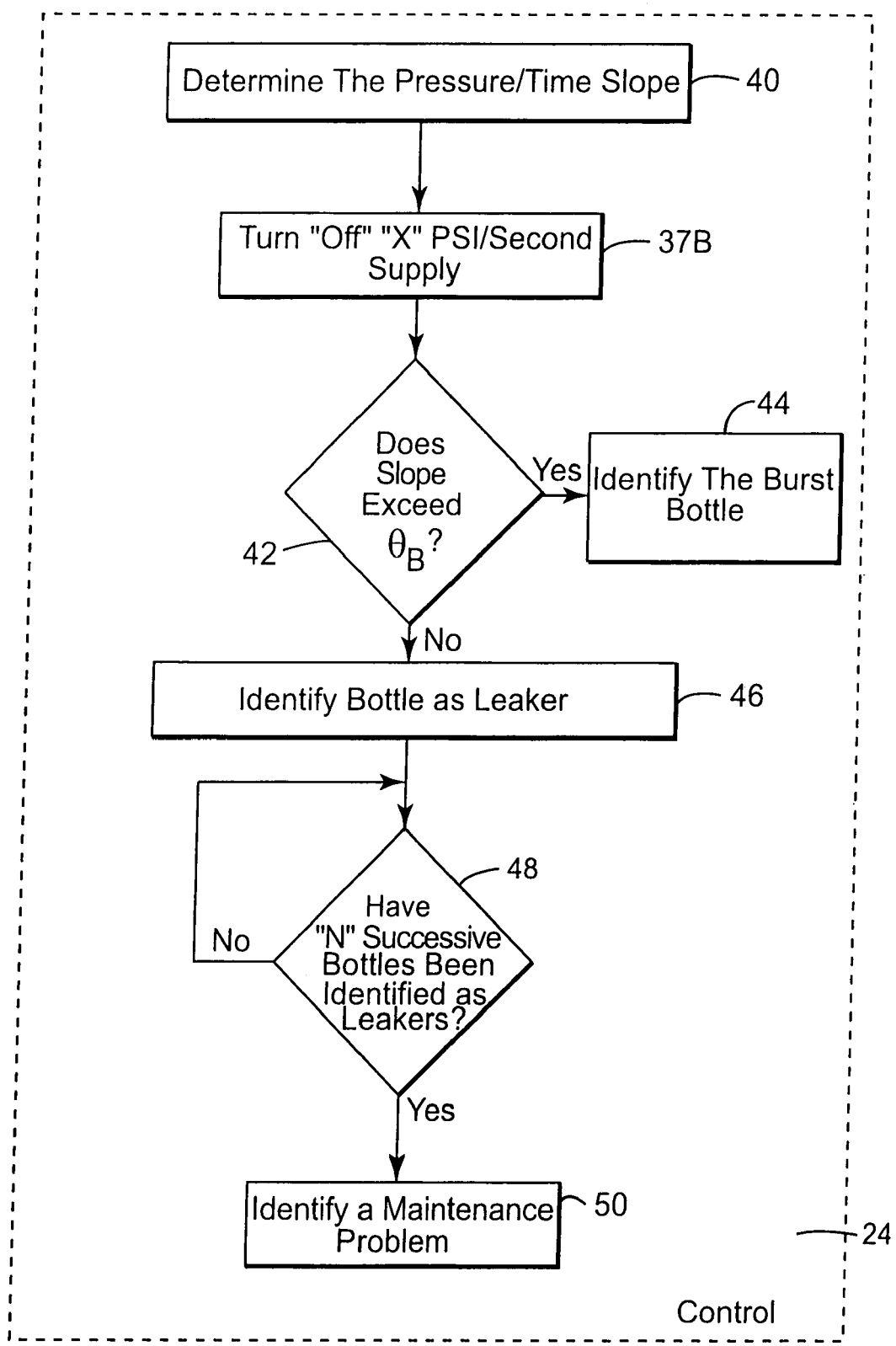

The inspection machine has a base 10 which is located at an inspection station. A bottle 12 filled with water 14, is delivered to the inspection station by a suitable delivery structure (here the gripping jaws 15 of one of the arms of a rotary feeder are shown). The water-filled bottle will be supported by the base 10. The inspection machine has a test head 16, which includes an upper inlet housing 18 and an annular sealing member 20. An "X" PSI/SECOND SUPPLY 22/FIG. 2 ("X" is settable) supplies air to the pressure head. This supply will result in a pressure within the head which increases linearly (line 30, FIG. 3). A PRESSURE SENSOR 26 supplies pressure (P) sensed within the test head to the CONTROL 24. A mold number reader (not shown) supplies the BOTTLE CAVITY NUMBER for each bottle to be tested to the CONTROL 24.

Figure 3:
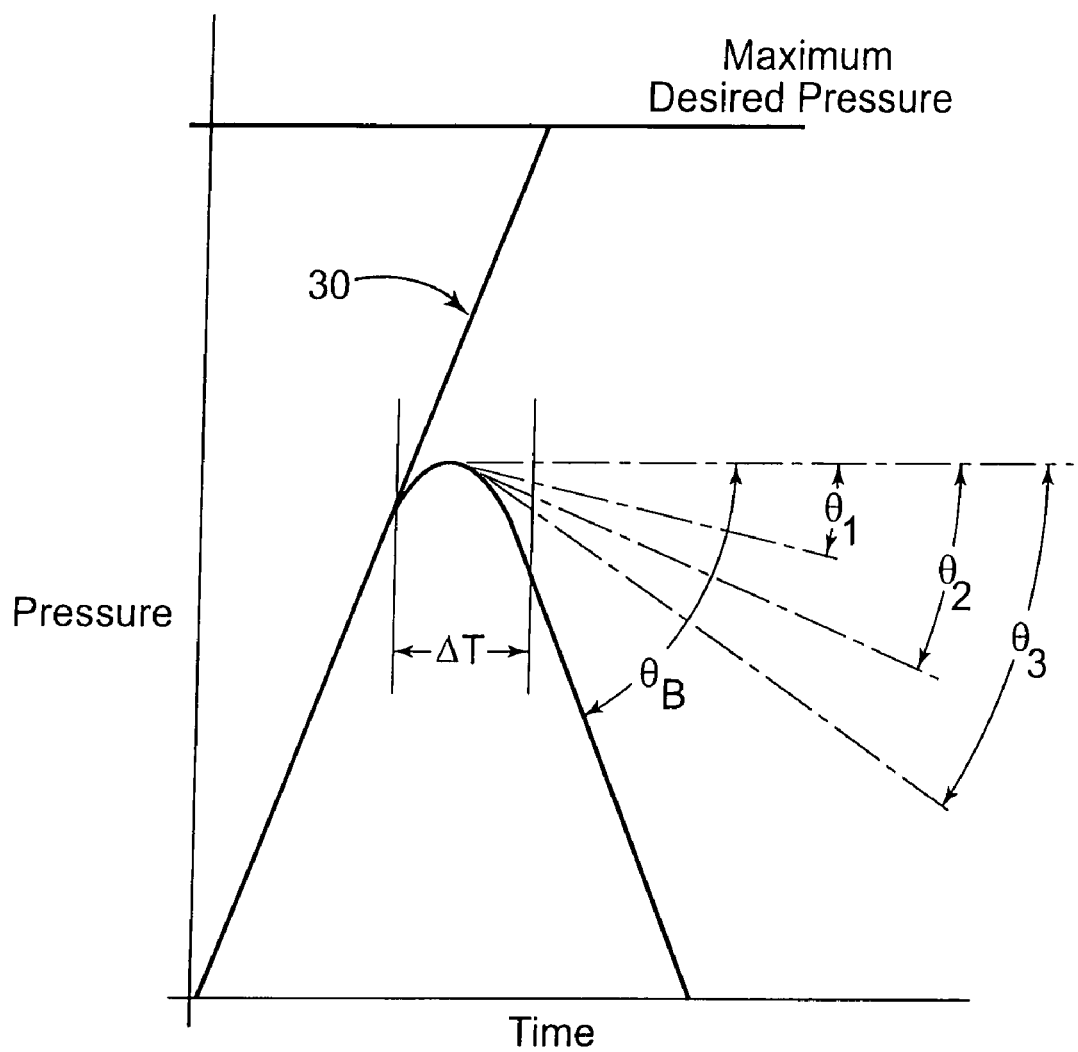
FIG. 3 shows a number of pressures vs. time curves for a bottle being subjected to pressure.

When a good bottle is tested, the CONTROL 24 will OPERATE "X" PSI/SECOND SUPPLY 29 (supply an "ON" signal) and pressure will increase in a substantially linear fashion until the CONTROL 24 senses the DESIRED MAXIMUM PRESSURE (FIG. 3). As the pressure is applied, the CONTROL first will answer the query IS BOTTLE PRESSURIZED? 31 in the affirmative and then will answer the query "IS SENSED PRESSURE EQUAL TO DESIRED MAXIMUM PRESSURE? 32 in the negative as pressure builds to the DESIRED MAXIMUM PRESSURE. With a negative answer, the CONTROL 24 answers the query "IS BOTTLE PRESSURE INCREASING AT LINEAR RATE?" 34. With a good bottle this answer will be in the affirmative and ultimately the query "IS SENSED PRESSURE EQUAL TO DESIRED MAXIMUM PRESSURE? 32 will be answered "YES" and the CONTROL 24 will indicate that the BOTTLE PASSES TEST 36 and will TURN OFF "X" PSI/SECOND SUPPLY 37, i.e., supply an "OFF" signal.

In the event that the query IS BOTTLE PRESSURIZED? 31 is answered in the negative, the CONTROL 24 will indicate that a BOTTLE IS MISSING 35 and will TURN "OFF" X" PSI/SECOND SUPPLY 37A. Should the bottle burst as pressure is applied or should there be a leak (whether from a defective bottle or from a worn annular sealing member) the sensed pressure will not reach the DESIRED MAXIMUM PRESSURE. Instead, the pressure will reach a maximum below the DESIRED MAXIMUM PRESSURE and then proceed to fall off. The CONTROL will determine this fact by answering the query "IS BOTTLE PRESSURE INCREASING AT LINEAR RATE?" 34 in the negative and SET ΔT (delta Time) DELAY 38. After this delay, the pressure decrease will be substantially linear making an angle $\Theta_1$, $\Theta_2$, $\Theta_3$, for example or $\Theta_B$. (Theta 1,_2,_3,_B) with the horizontal. $\Theta_B$, which can be empirically defined, defines the angle when a bottle bursts. The CONTROL 24 will DETERMINE THE PRESSURE/TIME SLOPE (angle Theta from horizontal) 40 and will TURN OFF "X" PSI/SECOND SUPPLY 37B. When the CONTROL 24 answers the query "DOES SLOPE EXCEED $\Theta_B$? 42 in the affirmative, the CONTROL 24 will IDENTIFY THE BURST BOTTLE 44. If this query is answered in the negative, the CONTROL 24 will IDENTIFY BOTTLE AS LEAKER 46, i.e., there is a surface defect in the bottle finish that is causing the bottle to leak or the annular sealing member 20 is worn causing a leak. The CONTROL 24 then answers the query HAVE "N" SUCCESSIVE BOTTLES BEEN IDENTIFIED AS LEAKERS? 48. When this is answered in the affirmative, the CONTROL 24 will IDENTIFY A MAINTENANCE PROBLEM 50—the annular sealing member 20 may be worn causing it to leak.

Figure 1:
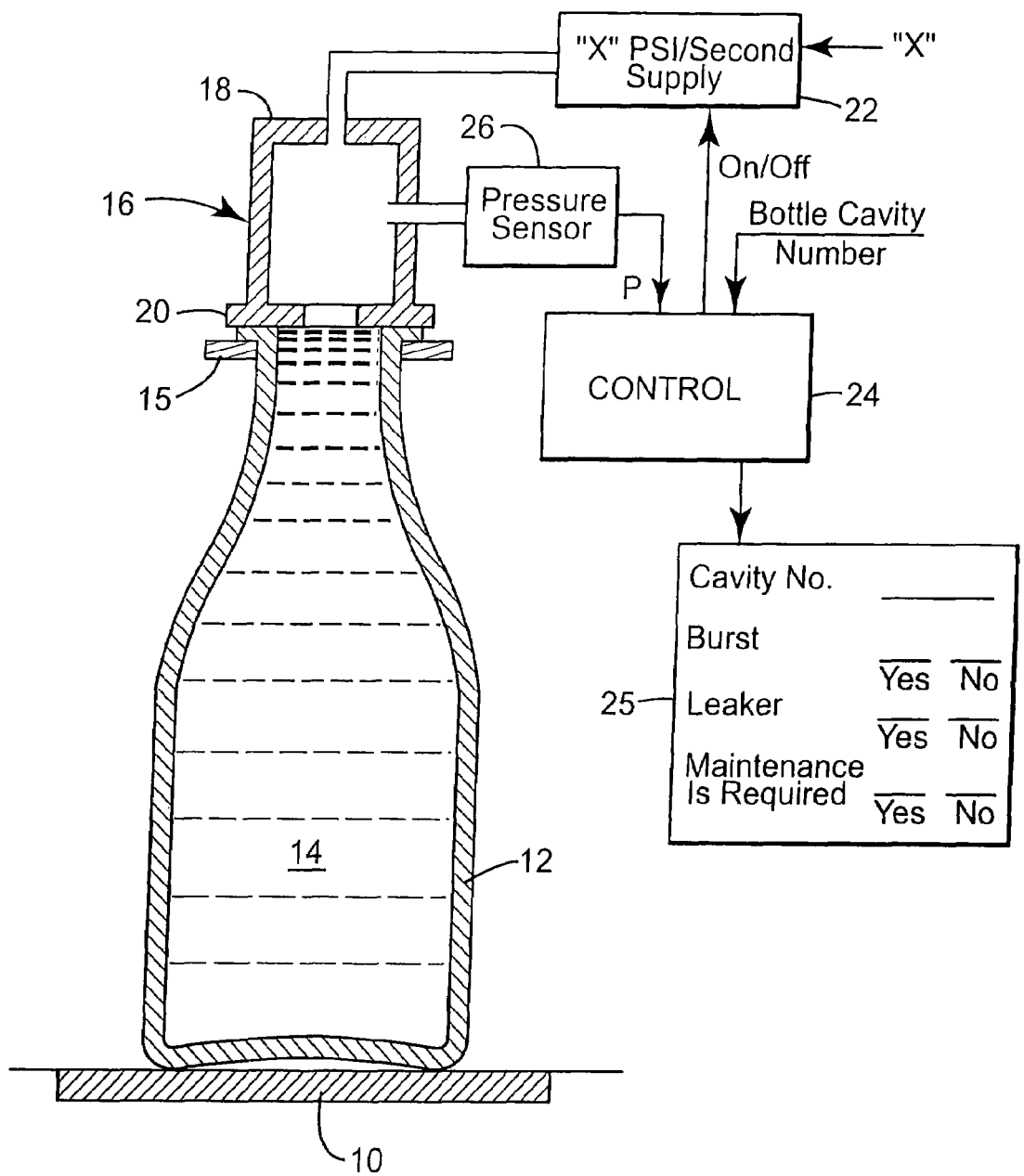
FIG. 1 is an elevational view of an inspection machine for pressure testing a bottle filled with water.

The machine has a display 25 (FIG. 1) which for each bottle tested will present its CAVITY NO., whether or not it BURST, whether or not it was a LEAKER, and whether or not MAINTENANCE IS REQUIRED.

The invention claimed is:

1. An inspection machine for pressure testing a glass container, comprising:
   a pressure head locatable on the top of a water filled glass container,
   a PSI/second air supply connected to said pressure head for subjecting the container to pressure increasing at a linear rate,
   a control, and
   a pressure sensor for sensing the pressure within the pressure head and supplying the sensed pressure to said control,
   said control for
      operating said PSI/second air supply until a desired maximum pressure is sensed by said pressure sensor in a container that does not burst or leak,
      determining when a container bursts or leaks,
      determining, when a container bursts or leaks, the slope of the pressure curve as it falls off from a maximum value below said desired maximum pressure, identifying the container as a burst container when said slope exceeds a defined slope, identifying the container as a leaker when said slope is less than the defined slope, and when in a predetermined number of successive containers the pressure curve falls off from a maximum value and said slope is less than said defined slope, identifying a maintenance problem.

2. An inspection machine for pressure testing a glass container according to claim 1, wherein said control for determining when the container bursts or leaks comprises means for determining that the pressure curve has a linear portion followed by a portion that departs from linear.

3. An inspection machine for pressure testing a glass container according to claim 2, wherein said control for determining the slope of the pressure curve as it falls from a maximum value includes time delay means operable when the linear portion transitions to the portion that departs from linear.

4. An inspection machine for pressure testing a glass container comprising:
   a pressure head locatable on the top of a water filled glass container;
   an air supply connected to said pressure head for subjecting the container to pressure increasing at a linear rate;
   a control;
   a pressure sensor for sensing the pressure within the pressure head and supplying the sensed pressure to said control;
   wherein said control operates said air supply until a desired maximum pressure is sensed by said pressure sensor in a container that does not burst or leak;
   wherein said control determines when a container bursts; and
   wherein said control determines when a container leaks.

5. The inspection machine of claim 4, wherein the control checks the pressure within the pressure head a plurality of times.

6. The inspection machine of claim 4, wherein the control determines whether the pressure within the pressure head is equal to said desired maximum pressure.

7. The inspection machine of claim 4, wherein the control determines the rate of change of the pressure within the pressure head.

8. The inspection machine of claim 4 wherein the control determines that the inspection machine needs maintenance when the control has determined that a set number of or leaked.

9. An inspection machine for pressure testing a glass container comprising:
   a pressure head locatable on the top of a water filled glass container;
   an air supply connected to said pressure head for subjecting the container to pressure increasing at a linear rate;
   a control;
   a pressure sensor for sensing the pressure within the pressure head and supplying the sensed pressure to said control;
   wherein said control operates said air supply until a desired maximum pressure is sensed by said pressure sensor in a container that does not burst or leak;
   wherein said control determines when a container bursts; and wherein said control determines when a container leaks, wherein
   the control determines whether the rate of change of the pressure within the pressure head is linear.

10. The inspection machine of claim 9 wherein the control further comprises time delay means operable when the control determines that the rate of change of the pressure within the pressure head is not linear.

11. The inspection machine of claim 10 wherein subsequent to a time delay effected by said time delay means following a determination that the rate of change of the pressure within the pressure head is not linear, the control determines the rate of change of the pressure within the pressure head and determines that the glass container burst if the rate of change of the pressure within the pressure head exceeds a set value, and
   the control determines that the glass container is a leaker if the rate of change of the pressure within the pressure head is less than a set value.

12. A method for inspecting glass containers, comprising:
   forcing air into a glass container;
   subjecting said glass container to a pressure increasing at a linear rate;
   sensing the pressure within said glass container using a sensor;
   ceasing to force air into said glass container when either a desired maximum pressure is sensed by the sensor or when said sensor senses that said pressure within said glass container is no longer increasing at a linear rate;
   after sensing that said pressure is no longer increasing at a linear rate, sensing a rate of decrease of pressure;
   comparing said rate of decrease of pressure to a predetermined rate of decrease to determine whether said glass container is a leaker or a burster;
   identifying a maintenance problem when a predetermined number of successive glass containers are determined to be leakers or bursters.

* * * * *